United States Patent
Nishikibe et al.

(10) Patent No.: US 9,677,313 B2
(45) Date of Patent: Jun. 13, 2017

(54) VEHICLE-DOOR CONTROL DEVICE AND OPENING/CLOSING SYSTEM FOR VEHICLE

(71) Applicants: AISIN SEIKI KABUSHIKI KAISHA, Kariya-shi (JP); TOYOTA JIDOSHA KABUSHIKI KAISHA, Toyota-shi (JP)

(72) Inventors: Takeshi Nishikibe, Tokai (JP); Kohei Kobayashi, Ichinomiya (JP); Yoshinori Hitomi, Okazaki (JP); Takeshi Katsuda, Nagoya (JP); Shunsuke Hayakawa, Obu (JP)

(73) Assignees: AISIN SEIKI KABUSHIKI KAISHA, Kariya-shi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/914,479

(22) PCT Filed: Aug. 27, 2014

(86) PCT No.: PCT/JP2014/072405
§ 371 (c)(1),
(2) Date: Feb. 25, 2016

(87) PCT Pub. No.: WO2015/030043
PCT Pub. Date: Mar. 5, 2015

(65) Prior Publication Data
US 2016/0201377 A1    Jul. 14, 2016

(30) Foreign Application Priority Data
Aug. 30, 2013  (JP) .................................. 2013-179490

(51) Int. Cl.
*E05F 15/40*   (2015.01)
*B60J 5/04*    (2006.01)
(Continued)

(52) U.S. Cl.
CPC ............... *E05F 15/41* (2015.01); *B60J 5/047* (2013.01); *E05F 15/40* (2015.01); *E05F 15/632* (2015.01);
(Continued)

(58) Field of Classification Search
CPC . E05F 15/40; E05F 15/41; E05F 15/42; E05F 15/632; B60J 5/047; H02H 7/0851;
(Continued)

(56) References Cited

U.S. PATENT DOCUMENTS 5,239,779 A * 8/1993 DeLand ..................... B60J 5/06
49/360
5,434,487 A * 7/1995 Long ....................... E05F 15/75
318/280
(Continued)

FOREIGN PATENT DOCUMENTS

JP    2003-148048 A    5/2003
JP    2006-97407 A     4/2006
(Continued)

OTHER PUBLICATIONS

International Preliminary Report on Patentability and Written Opinion issued Mar. 1, 2016 in PCT/JP2014/072405 filed Aug. 27, 2014 (submitting English translation only).
(Continued)

*Primary Examiner* — Justin Rephann
(74) *Attorney, Agent, or Firm* — Oblon, McClelland, Maier & Neustadt, L.L.P.

(57) ABSTRACT

A vehicle-door opening/closing control device includes a controller, which controls the operation of a drive device.
(Continued)

The controller is configured to supply drive power based on a voltage of an in-vehicle power supply to an electromagnetic clutch. The controller is also configured such that, when stopping an opening/closing body at an intermediate position, the controller supplies the drive power based on the voltage of the in-vehicle power supply to the electromagnetic clutch to put the clutch in the engaged state, and then stops the supply of drive power to the electromagnetic clutch so that the clutch is in the disengaged state after a predetermined holding time has elapsed since the controller has stopped the opening/closing body at the intermediate position. The predetermined holding time differs between a case where the trapping of the foreign object is detected and a case where the opening/closing manipulation is detected.

10 Claims, 7 Drawing Sheets

(51) Int. Cl.
  *E05F 15/41* (2015.01)
  *E05F 15/632* (2015.01)
  *H02H 7/085* (2006.01)

(52) U.S. Cl.
  CPC ... *E05Y 2201/216* (2013.01); *E05Y 2201/462* (2013.01); *E05Y 2900/531* (2013.01); *H02H 7/0851* (2013.01)

(58) Field of Classification Search
  CPC ......... E05Y 2201/216; E05Y 2201/462; E05Y 2900/531
  See application file for complete search history.

(56) References Cited

U.S. PATENT DOCUMENTS

| | | | | |
|---|---|---|---|---|
| 6,087,794 A | * | 7/2000 | Kawanobe | B60J 5/06 318/446 |
| 6,134,836 A | * | 10/2000 | Kawanobe | E05F 15/646 340/12.22 |
| 6,256,930 B1 | * | 7/2001 | Faubert | E05F 15/695 49/362 |
| 6,435,600 B1 | * | 8/2002 | Long | B60J 5/06 296/155 |
| 2004/0262945 A1 | * | 12/2004 | Suzuki | E05B 65/0811 296/155 |
| 2006/0232100 A1 | * | 10/2006 | Kamiya | B60J 5/06 296/147 |
| 2006/0283089 A1 | * | 12/2006 | Ishihara | E05F 15/40 49/360 |
| 2007/0107313 A1 | | 5/2007 | Suzuki et al. | |
| 2009/0229183 A1 | | 9/2009 | Kamiya | |
| 2012/0323370 A1 | | 12/2012 | Nishikibe et al. | |
| 2014/0039766 A1 | | 2/2014 | Miyake et al. | |
| 2014/0150581 A1 | * | 6/2014 | Scheuring | B60J 5/047 74/89.38 |

FOREIGN PATENT DOCUMENTS

| | | |
|---|---|---|
| JP | 2006-213206 A | 8/2006 |
| JP | 2007-138444 A | 6/2007 |
| JP | 2009-221652 A | 10/2009 |
| JP | 2009-301300 A | 12/2009 |
| JP | 4848457 B2 | 12/2011 |
| JP | 2012-36569 A | 2/2012 |
| JP | 2012-219469 A | 11/2012 |
| JP | 2013-2110 A | 1/2013 |
| JP | 2013-92019 A | 5/2013 |

OTHER PUBLICATIONS

"Mazda MPV New Model Handbook," Mazda Motor Corporation, Jan. 2008, 5 pages (With partial English translation).
International Search Report Issued Oct. 21, 2014 in PCT/JP14/72405 Filed Aug. 27, 2014.

* cited by examiner

VEHICLE-DOOR CONTROL DEVICE AND OPENING/CLOSING SYSTEM FOR VEHICLE

TECHNICAL FIELD

The present invention relates to a vehicle opening/closing body control device and an opening/closing system for a vehicle.

BACKGROUND ART

Conventionally, there are vehicles that mount a vehicle opening/closing body control device that controls the operation of a drive device to open/close an opening/closing body such as a slide door. Such a vehicle opening/closing body control device has a function to detect that a foreign object is trapped by the opening/closing body during the opening/closing operation of the opening/closing body by driving the drive device.

Conventional methods of detecting trapping of a foreign object includes a method of detecting a foreign object based on changes of parameters such as a change of a value of current supplied to a motor as a driving source of a drive device and a change of a velocity of the movement of the opening/closing body (for example, Patent Document 1) and a method of detecting a foreign object using sensors such as a touch sensor (pressure sensor) (for example, Patent Document 2). When trapping of a foreign object is detected, the moving direction of the opening/closing body is reversed to move off the trapped foreign object.

In recent years, it has been proposed that after reversing the moving direction of the opening/closing body, the opening/closing body be moved by a predetermined distance, and then stopped at an intermediate position in the operation range of the opening/closing body. Then, the same foreign object is restricted from being trapped again by the opening/closing body, the moving direction of which has been reversed. Refer to the description of paragraph [0040] of Patent Document 2, and Non-Patent Document 1.

Another conventional vehicle opening/closing body control device has a function to stop the opening/closing body at an intermediate position in the operation range of the opening/closing body when the opening/closing manipulation (for example, manipulation of a door handle) by a user is detected during the opening/closing operation of the opening/closing body by the drive device. For example, refer to Patent Documents 3 and 4. This limits the amount of opening of the opening/closing body at a time of rainy weather, for example, to the minimum amount of opening in which a user can exit/enter the vehicle to improve convenience.

PRIOR ART DOCUMENTS

Patent Documents

Patent Document 1: Japanese Laid-Open Patent Publication No. 2013-2110
Patent Document 2: Japanese Laid-Open Patent Publication No. 2013-92019
Patent Document 3: Japanese Laid-Open Patent Publication No. 2012-36569
Patent Document 4: Japanese Laid-Open Patent Publication No. 2012-219469

Non-Patent Document

Non-Patent Document 1: "Mazda MPV New Model Handbook", Mazda Motor Corporation, January, 2008

SUMMARY OF THE INVENTION

Problems that the Invention is to Solve

Generally, a drive device includes an electromagnetic clutch, which engages or disengages transmission of a driving force between a motor and an opening/closing body. When stopping the opening/closing body at an intermediate position, the drive power is supplied to an electromagnetic clutch to put the clutch in the engaged state. This holds the position of the opening/closing body at the intermediate position by a holding force based on the holding torque (cogging torque) of the motor. This restricts the movement of the opening/closing body by its own weight when the vehicle stops on a slope, for example.

However, when the electromagnetic clutch is in the engaged state, the drive power should be continued to be supplied to the electromagnetic clutch. As the time in which the opening/closing body is held at an intermediate position becomes longer, a problem is caused that the voltage of the in-vehicle power supply (battery) is lowered. There is a need for improving the problem.

An objective of the present invention is to provide a vehicle opening/closing body control device and an opening/closing system for a vehicle that limit the reduction of the voltage of the in-vehicle power supply.

Means for Solving the Problems

To achieve the above described objective, a vehicle-door opening/closing body control device including: a drive device, a trapping detector, an opening/closing manipulation detector, an opening/closing manipulation detector, and a controller is provided. The drive device opens/closes an opening/closing body of a vehicle. The trapping detector detects a trapping of a foreign object by the opening/closing body. The opening/closing manipulation detector detects an opening/closing manipulation for opening/closing the opening/closing body by driving the drive device. The controller controls an operation of the drive device such that the opening/closing body is stopped at an intermediate position in an operation range of the opening/closing body when the trapping of the foreign object is detected or when the opening/closing manipulation is detected during an opening operation or closing operation of the opening/closing body. The drive device includes an electromagnetic clutch, which is configured to transmit a driving force to the opening/closing body and engages or disengages transmission of a driving force between the opening/closing body and a motor as a driving source of the drive device. The controller is configured to supply a drive power based on a voltage of an in-vehicle power supply to the electromagnetic clutch. To stop the opening/closing body at an intermediate position, the controller supplies the drive power based on the voltage of the in-vehicle power supply to the electromagnetic clutch to put the electromagnetic clutch in an engaged state and then stops the supply of the drive power to the electromagnetic clutch to put the electromagnetic clutch in a disengaged state after a predetermined holding time has elapsed since the controller has stopped the opening/closing body at the intermediate position. The predetermined holding time differs between a case where the trapping of the foreign object is detected and a case where the opening/closing manipulation is detected.

According to a second aspect, an opening/closing system for a vehicle including the vehicle-door opening/closing body control device according to the above first aspect is provided.

MODES FOR CARRYING OUT THE INVENTION

First Embodiment

Hereinafter, a vehicle opening/closing body control device according to a first embodiment will be described with reference to the drawings.

Figure 1:
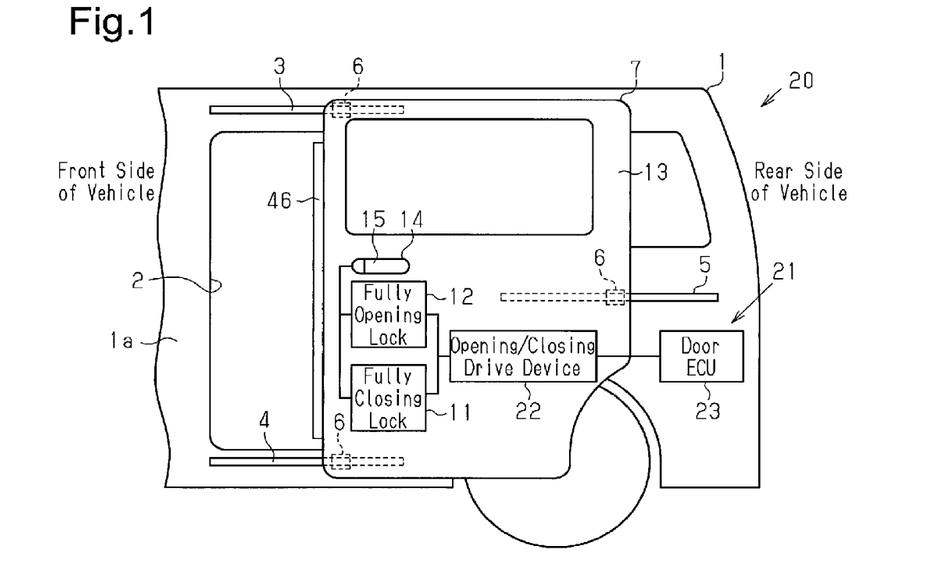
FIG. 1 is a structural diagram schematically illustrating a power slide door device.

As shown in FIG. 1, a door opening 2 as an opening is provided in a side of a vehicle body 1. An upper rail 3 and a lower rail 4 are provided on the upper edge and the lower edge of the door opening, respectively, such that the upper rail 3 and the lower rail 4 extend in the vehicle front-back direction. A center rail 5, which extends in the vehicle front-back direction, is provided on the door opening 2 on the side of the vehicle body 1 on the rear side of the vehicle, i.e., on the right side as viewed in FIG. 1. Each of the rails 3 to 5 according to the present embodiment has a front end portion, which curves in the inward direction of the vehicle.

A slide door 7 as an opening/closing body is supported by the rails 3 to 5 via rollers 6 in a movable manner in the vehicle front-back direction. The slide door 7 opens or closes the door opening 2 by moving in the vehicle front-back direction. Specifically, when the slide door 7 moves toward the front side of the vehicle, or in a closing direction, i.e., toward the left side as viewed in FIG. 1, the slide door 7 closes the door opening 2, so that the door opening 2 is put in the closed state. In contrast, when the slide door 7 moves toward the rear side of the vehicle, or in an opening direction, the slide door 7 opens the door opening 2 so that the door opening 2 is put in the open state, in which the user is allowed to exit/enter the vehicle.

The slide door 7 includes a fully closing lock (latch mechanism) 11, which holds the slide door 7 at a fully closed position Pc, at which the door opening 2 is in the closed state. A known structure that holds the slide door 7 at the fully closed position Pc by drawing a latch (not shown) into a striker (not shown) is employed as the fully closing lock 11 according to the present embodiment. The slide door 7 includes a fully opening lock 12, which holds the slide door 7 at a fully open position Po, at which the door opening 2 is in the open state. A known structure that holds the slide door 7 at the fully open position Po by engaging or disengaging a hook (not shown) with or from an engaging pin (not shown) provided on the vehicle body 1 is employed as the fully opening lock 12 according to the present embodiment.

A door handle 14 manipulated when opening/closing the slide door 7 is provided on an outer panel 13, which configures an outer surface (ornamental surface) of the slide door 7. A movable hand grip 15 is provided on the door handle 14. The hand grip 15 according to the present embodiment has a known structure in which the hand grip 15 is manipulated in the vehicle rear direction so that the front end of the hand grip 15 is pulled and raised. The door handle 14 is mechanically coupled to the fully closing lock 11 and the fully opening lock 12 via transmission members such as wires. This transmits the manipulation on the door handle 14 to the fully closing lock 11 or the fully opening lock 12 based on the manipulation of the hand grip 15, which configures a grasping portion of the door handle 14. A door handle (not shown) is provided on an inner panel (not shown), which configures the inner surface of the slide door 7, in the same manner.

Regarding the slide door 7 as configured above, the movement of the slide door 7 at the fully closed position Pc in the opening direction and the movement of the slide door 7 at the fully open position Po in the closing direction are permitted if the slide door 7 held by the fully closing lock 11 or the fully opening lock 12 is released based on the manipulation on the door handle 14 by the user.

Figure 2:
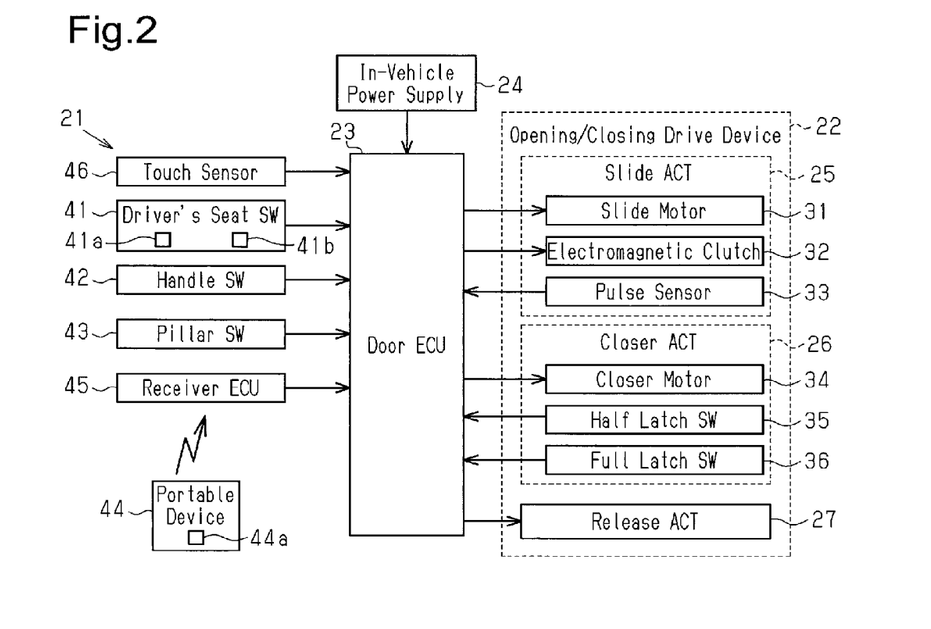
FIG. 2 is a block diagram illustrating the power slide door device.

As shown in FIGS. 1 and 2, a power slide door device 21, which serves as a vehicle opening/closing body control device, is mounted on the vehicle. The power slide door device 21 and the slide door 7 configure an opening/closing system 20 for a vehicle. The power slide door device 21 includes a drive device 22, which opens/closes the slide door 7, and a door ECU 23, which serves as a controller for controlling the operation of the drive device 22. The door ECU 23 is connected to an in-vehicle power supply (battery) 24, and controls the operation of the drive device 22 by supplying a drive power to the drive device 22 based on the voltage of the in-vehicle power supply 24. The door ECU 23 may be provided in either one of the slide door 7 and the vehicle body 1.

In details, as shown in FIG. 2, the drive device 22 includes a slide actuator 25, a closer actuator 26, and a release actuator 27. The slide actuator 25 is coupled to the slide door 7 via an appropriate transmission mechanism (not shown), and opens/closes the slide door 7 in the openable/closable manner. The closer actuator 26 is coupled to the fully closing lock 11 via an appropriate transmission mechanism (not shown), and moves the slide door 7 that is ajar to the fully closed position Pc, where the fully closing lock 11 holds the slide door 7. The release actuator 27 is coupled to the fully closing lock 11 and the fully opening lock 12 via appropriate transmission mechanisms (not shown), and releases the slide door 7 at the fully closed position Pc held by the fully closing lock 11 and the slide door 7 at the fully open position Po held by the fully opening lock 12.

In more details, the slide actuator 25 includes a slide motor 31, which serves as a driving source, an electromagnetic clutch 32, and a pulse sensor 33. The drive power supplied from the door ECU 23 controls the rotation direction and the number of rotations of the slide motor 31. The electromagnetic clutch 32 is switched, based on the presence or absence of the drive power supplied from the door ECU 23, between an engaged state, in which the rotation of the slide motor 31 is transmitted to the slide door 7, and a disengaged state, in which the rotation of the slide motor 31 is not transmitted to the slide door 7. The slide motor 31 is coupled to the slide door 7 (transmission mechanism) via the electromagnetic clutch 32. If the electromagnetic clutch 32 is in the disengaged state, the slide door 7 is movable without rotating the slide motor 31. This allows a user to manually open/close the slide door 7 without applying a significant force, i.e., to move the slide door 7 in the front-back direction.

The pulse sensor 33 supplies two pulse signals with phases different from each other in accordance with the rotation of the slide motor 31 to the door ECU 23. The door ECU 23 detects the position (open/closed position) of the slide door 7 by measuring the number of pulses of the pulse signals with a predetermined position (e.g., fully closed position Pc) as reference. The door ECU 23 detects the rotation direction of the slide motor 31, i.e., the operation direction of the slide door 7 based on the input order of the pulses of the two pulse signals supplied from the pulse sensor 33. Further, the door ECU 23 detects the operation velocity V of the slide door 7 by differentiating the detected door position. That is, in the present embodiment, the pulse sensor 33 and the door ECU 23 configure an opening/closing body position detector.

The closer actuator 26 includes a closer motor 34, which serves as a driving source, a half latch switch 35, and a full latch switch 36. The drive power supplied from the door ECU 23 controls the rotation direction and the number of rotations of the closer motor 34. If the latch of the half latch switch 35 is in the retained state so that the slide door 7 is ajar, the ON/OFF state of the half latch switch 35 is switched. If the latch of the full latch switch 36 fully fits into the striker so that the slide door 7 is held at the fully closed position Pc, the ON/OFF state of the full latch switch 36 is switched.

The door ECU 23 drives the drive device 22 to move the slide door 7 in the closing direction (closing operation). In this case, if the slide door 7 is at the fully open position Po, the door ECU 23 drives the release actuator 27 to release the slide door 7 held by the fully opening lock 12. If the slide door 7 is in the openable/closable state, the door ECU 23 then drives the slide actuator 25 to close the slide door 7. If the door ECU 23 detects that the slide door 7 is ajar based on the ON/OFF state of the half latch switch 35, the door ECU 23 then controls the operation of the closer actuator 26 to draw the latch into the striker so that the fully closing lock 11 holds the slide door 7 at the fully closed position Pc. The door ECU 23 disengages the electromagnetic clutch 32 if the slide door 7 is held at the fully closed position Pc.

The door ECU 23 also drives the drive device 22 to move the slide door 7 in the opening direction (opening operation). In this case, if the slide door 7 is at the fully closed position Pc, the door ECU 23 drives the release actuator 27 to release the slide door 7 held by the fully closing lock 11. If the slide door 7 is in the openable/closable state, the door ECU 23 then drives the slide actuator 25 to open the slide door 7. If the door ECU 23 determines that the slide door 7 is in the stopped state in a preset fully open range, the door ECU 23 determines that the slide door 7 is held at the fully open position Po by the fully opening lock 12. The door ECU 23 disengages the electromagnetic clutch 32 if the slide door 7 is held at the fully open position Po.

Figure 3:
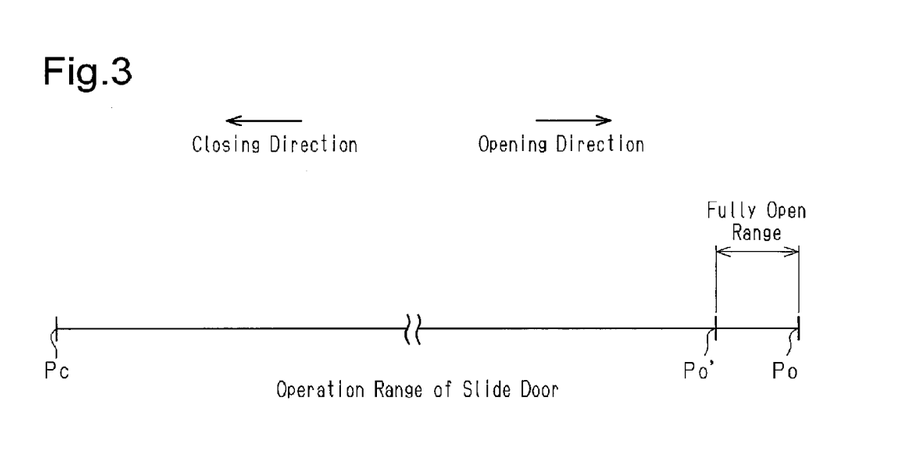
FIG. 3 is a schematic diagram illustrating the operation range of the slide door.

As shown in FIG. 3, the fully open range is a range between the fully open position Po and an assumed fully open position Po', which is a position shifted in the closing direction from the fully open position Po. The fully open range is set in consideration of the fact that the position of the slide door 7 held by the fully opening lock 12 varies in each vehicle due to dimensional tolerances of each component such as the slide door 7, and the rails 3 to 5. Further, the door ECU 23 determines that the slide door 7 is in the stopped state when the operation velocity V of the slide door 7 detected based on the pulse signals of the pulse sensor 33 continues to be less than or equal to a velocity determination threshold value Vth for a predetermined stop determination period or longer.

As shown in FIG. 2, the door ECU 23 is electrically connected to a driver's seat switch 41, which serves as a driver's seat opening/closing manipulation detector provided in a driver's seat region on an instrument panel, for example. The driver's seat region is in a range in which a user seated on the driver's seat performs manipulations. The driver's seat region includes parts such as surroundings of the interior light, the A pillar, the console box, or the inner panel of a swing door as well as the instrument panel. The door ECU 23 is electrically connected to a handle switch 42, which serves as an integrated opening/closing manipulation detector provided integrally with the door handle 14. The door ECU 23 is also electrically connected to a pillar switch 43 provided on a surface of a pillar 1a (B pillar) of the vehicle body 1 on the inner side of the vehicle. The door ECU 23 is also electrically connected to a receiver ECU 45, which performs wireless communications with a portable device (electronic key) 44 carried by the user.

In details, the driver's seat switch 41 is configured by two switches, i.e., an open switch 41a and a close switch 41b. When the open switch 41a is pressed by the user, the open switch 41a supplies an opening manipulation signal to the door ECU 23. When the close switch 41b is pressed by the user, the close switch 41b supplies a closing manipulation signal to the door ECU 23. The handle switch 42 supplies a trigger signal to the door ECU 23 in response to the manipulation of the door handle 14 by the user. When the trigger signal is supplied to the door ECU 23, the trigger signal is recognized as a manipulation signal in the direction opposite to the operation direction of the slide door 7 immediately before. For example, when the slide door 7 was in the opening operation immediately before, the trigger signal is recognized as a closing manipulation signal. When the pillar switch 43 is pressed by the user, the pillar switch 43 supplies a trigger signal to the door ECU 23 in the same manner as the handle switch 42 does. A portable device switch 44a, which serves as a portable device opening/closing manipulation detector, is provided in the portable device 44. When the receiver ECU 45 receives a transmission signal in response to the pressing manipulation of the portable device switch 44a of the portable device 44, the receiver ECU 45 supplies a trigger signal to the door ECU 23 in the same manner as the handle switch 42 does.

When the opening manipulation signal is supplied to the door ECU 23, the door ECU 23 performs an opening operation control for driving the drive device 22 to open the slide door 7 to the fully open position Po. When the closing manipulation signal is supplied to the door ECU 23, the door ECU 23 performs a closing operation control for driving the drive device 22 to close the slide door 7 to the fully closed position Pc. That is, in the present embodiment, the driver's seat switch 41, the handle switch 42, and the portable device switch 44a of the portable device 44 correspond to an opening/closing manipulation detector, which detects the opening/closing manipulation for opening/closing the slide door 7 by driving the drive device 22.

Even if the door ECU 23 according to the present embodiment does not detect any opening/closing manipulation by the user, the door ECU 23 drives the drive device 22 to close the slide door 7, i.e. perform the closing operation control (assistant closing operation control) in the following case. That is, the case where the slide door 7 moves in the closing direction to a position beyond the assumed fully open position Po' due to its own weight from a state in which the slide door 7 is within the fully open range.

Next, a process of the opening/closing control of the slide door by the door ECU will be described. The door ECU 23 performs a process shown in each of the following steps for every predetermined cycle.

Figure 4:
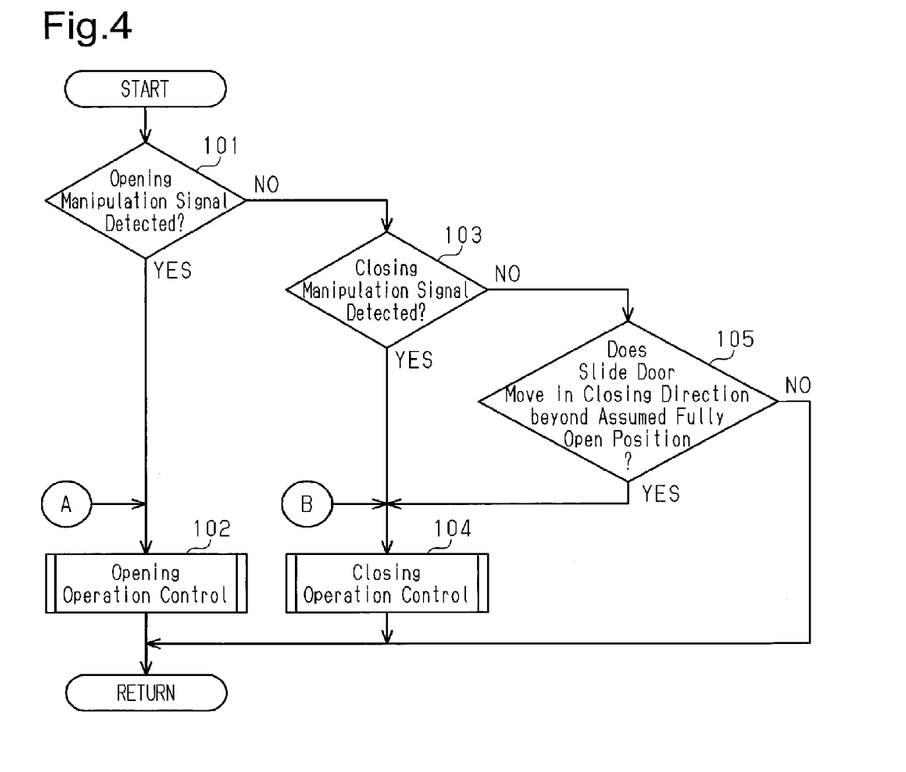
FIG. 4 is a flowchart illustrating a process of the opening/closing control of the slide door.

As shown in the flowchart of FIG. 4, the door ECU 23 first determines whether the opening operation signal has been input (step 101). If the door ECU 23 determines that the opening operation signal has been input (step 101: YES), the door ECU 23 performs the opening operation control to control the operation of the drive device 22 to open the slide door 7 (step 102).

If the door ECU 23 determines that the opening operation signal has not been input (step 101: NO), the door ECU 23 determines whether the closing operation signal has been input (step 103). If the door ECU 23 determines that the closing operation signal has been input (step 103: YES), the door ECU 23 performs the closing operation control to control the operation of the drive device 22 to close the slide door 7 (step 104). If the door ECU 23 determines that the closing operation signal has not been input (step 103: NO), the door ECU 23 determines whether the slide door 7 has moved in the closing direction from within the fully open range to a position beyond the assumed fully open position Po' (step 105). If the slide door 7 has moved beyond the assumed fully open position Po', (step 105; YES), the door ECU 23 moves to step 104 and performs the closing operation control. If the slide door 7 has not moved from within the fully open range beyond the assumed fully open position Po' (step 105; NO), the door ECU 23 does not perform each process of steps 102 and 104.

The power slide door device 21 according to the present embodiment has a function to detect that a foreign object is trapped between the slide door 7 and the vehicle body 1 during the opening operation and the closing operation of the slide door 7. The trapping of the foreign object includes a trapping of an object such as an umbrella between the vehicle body 1 and a portion of the slide door 7 on the inside panel side and a trapping of a part of the body of the user who exits/enters the vehicle between the door opening 2 and the outer edge of the slide door 7 on the front side, for example.

In details, as shown in FIG. 1, a touch sensor (pressure sensor) 46 is provided on the outer edge of the slide door 7 on the front side. The touch sensor 46 according to the present embodiment has electrode wires arranged apart from each other in a hollow tube made of an insulator. The touch sensor 46 is configured such that the electrode wires are brought into contact with or separated from each other in response to the touch pressure applied from a human body to the touch sensor 46 so that the detection current I that flows through the electrode wires changes.

As shown in FIG. 2, the touch sensor 46 is connected to the door ECU 23. The door ECU 23 determines that a foreign object is trapped if the absolute value of the detection current I as a detection signal is beyond a trapping determination threshold value Ith0 for a predetermined trapping determination period or longer during the opening operation and the closing operation of the slide door 7. The door ECU 23 determines whether the slide door 7 is in the stopped state based on the operation velocity V of the slide door 7 as well as whether the slide door 7 is held by the fully opening lock 12. If the slide door 7 is in the stooped state, the door ECU 23 determines that the foreign object is trapped. That is, in the present embodiment, the pulse sensor 33 and the door ECU 23 configure a trapping detector. The touch sensor 46 and the door ECU 23 also configure a trapping detector.

If the door ECU 23 detects a trapping of a foreign object by the slide door 7, the door ECU 23 moves the slide door 7 in the opposite direction by a predetermined distance, and then stops the slide door 7. Specifically, if the door ECU 23 detects trapping of the foreign object during the opening operation of the slide door 7, the door ECU 23 controls the operation of the drive device 22 such that the slide door 7 closes by a predetermined closing-and-returning distance and then stops. Further, if the door ECU 23 detects trapping of the foreign object during the closing operation of the slide door 7, the door ECU 23 controls the operation of the drive device 22 such that the slide door 7 opens by a predetermined opening-and-returning distance and then stops.

In the present embodiment, the predetermined closing-and-returning distance and the predetermined opening-and-returning distance are set as the same distance. In the case where the door ECU 23 detects trapping of a foreign object, moves the slide door 7 in the opposite direction, and then stops the slide door 7 at an intermediate position (position other than the fully open position Po and the fully closed position Pc) in the operation range, the door ECU 23 maintains the electromagnetic clutch 32 in the engaged state to perform a trapping stopping control, in which the door position of the slide door 7 is maintained. The electromagnetic clutch 32 is maintained in the engaged state so that the door position of the slide door 7 is held at an intermediate position by the holding force based on the holding torque (cogging torque) of the slide motor 31.

If the door ECU 23 detects the opening/closing manipulation by the user during the opening operation and the closing operation of the slide door 7, the door ECU 23 controls the operation of the drive device 22 such that the slide door 7 stops at the door position at which the manipulation is detected. If the door ECU 23 detects the opening/closing manipulation by the user and stops the slide door 7, the door ECU 23 maintains the electromagnetic clutch 32 in the engaged state to perform the opening/closing manipulation stopping control to hold the position of the slide door 7.

Next, a process of the opening operation control of the slide door by the door ECU will be described.

Figure 5:
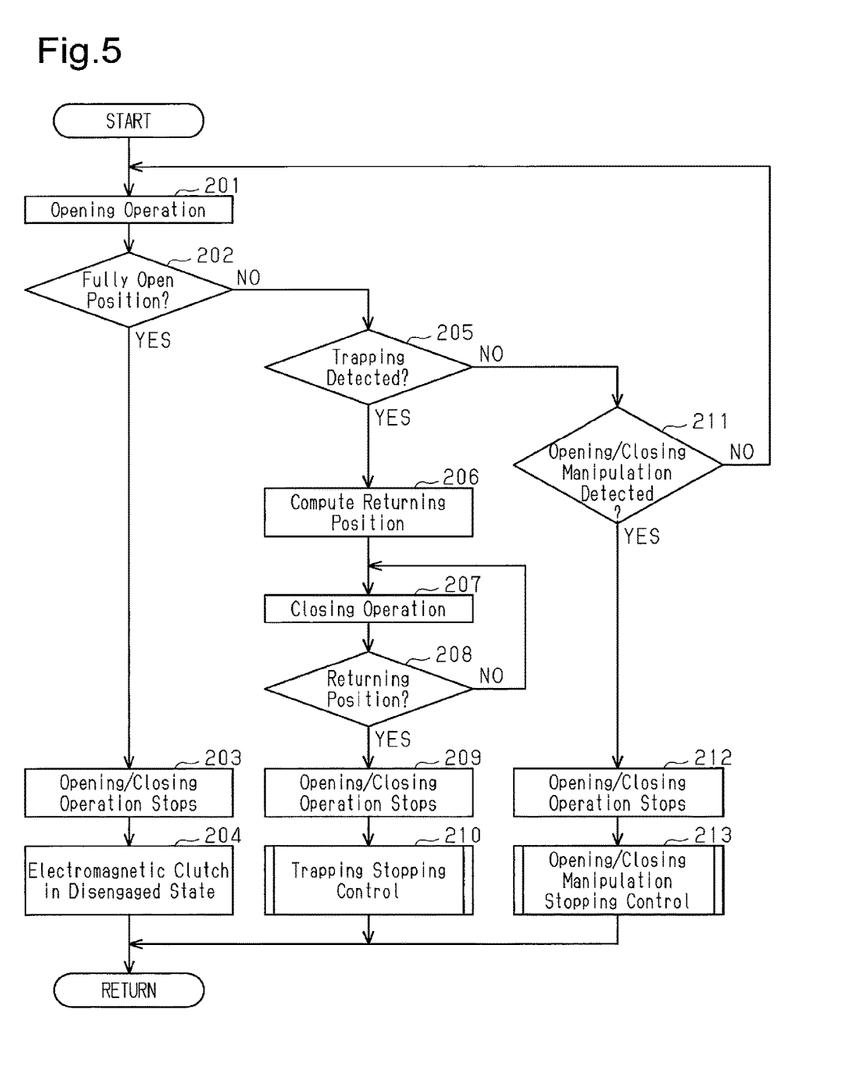
FIG. 5 is a flowchart illustrating a process of the opening operation control.

As shown in the flowchart of FIG. 5, the door ECU 23 drives the drive device 22 to open the slide door 7 (step 201) and determines whether the slide door 7 is at the fully open position Po (step 202). If the door ECU 23 determines that the slide door 7 is at the fully open position Po (step 202: YES), i.e., if the door ECU 23 does not detect trapping of a foreign object and the opening/closing manipulation of the user and the slide door 7 moves to the fully open position Po, the door ECU 23 stops the opening/closing operation of the slide door 7 by the drive device 22 (step 203), and maintains the electromagnetic clutch 32 in the disengaged state (step 204).

If the door ECU 23 determines that the slide door 7 is not at the fully open position Po (step 202: NO), the door ECU 23 detects the presence/absence of trapping of a foreign object by the slide door 7 (step 205). If the door ECU 23 detects trapping of a foreign object (step 205: YES), the door ECU 23 computes a returning position at which the slide door 7 is stopped after being moved in the opposite direction, i.e., a position to which the slide door 7 is moved in the closing direction by a predetermined closing-and-returning distance from the door position at the time when the door ECU 23 detects the trapping (step 206). The door ECU 23 then closes the slide door 7 (step 207) and determines whether the slide door 7 is in the returning position computed in step 206 (step 208). If the slide door 7 is at the returning position (step 208: YES), the door ECU 23 stops the opening/closing operation of the slide door 7 by the drive device 22 (step 209), and performs the trapping stopping control by which the electromagnetic clutch 32 is put in the engaged state to hold the slide door 7 (step 210). If the slide door 7 is not at the returning position (step 208: NO), the door ECU 23 moves to step 207, continues the closing operation, and repeats it until the slide door 7 moves to the returning position.

If the door ECU 23 does not detect trapping of a foreign object by the slide door 7 (step 205: NO), the door ECU 23 detects the presence/absence of the opening/closing manipulation by the user (step 211). If the door ECU 23 detects the opening/closing manipulation (step 211: YES), the door ECU 23 stops the opening/closing operation of the slide door 7 by the drive device 22 (step 212). This engages the electromagnetic clutch 32 and the door ECU 23 performs the opening/closing manipulation stopping control to hold the slide door 7 (step 213). If the door ECU 23 does not detect the opening/closing manipulation (step 211: NO), the door ECU 23 moves to step 201 and continues the closing operation.

Next, a process of the closing operation control of the slide door by the door ECU will be described.

Figure 6:
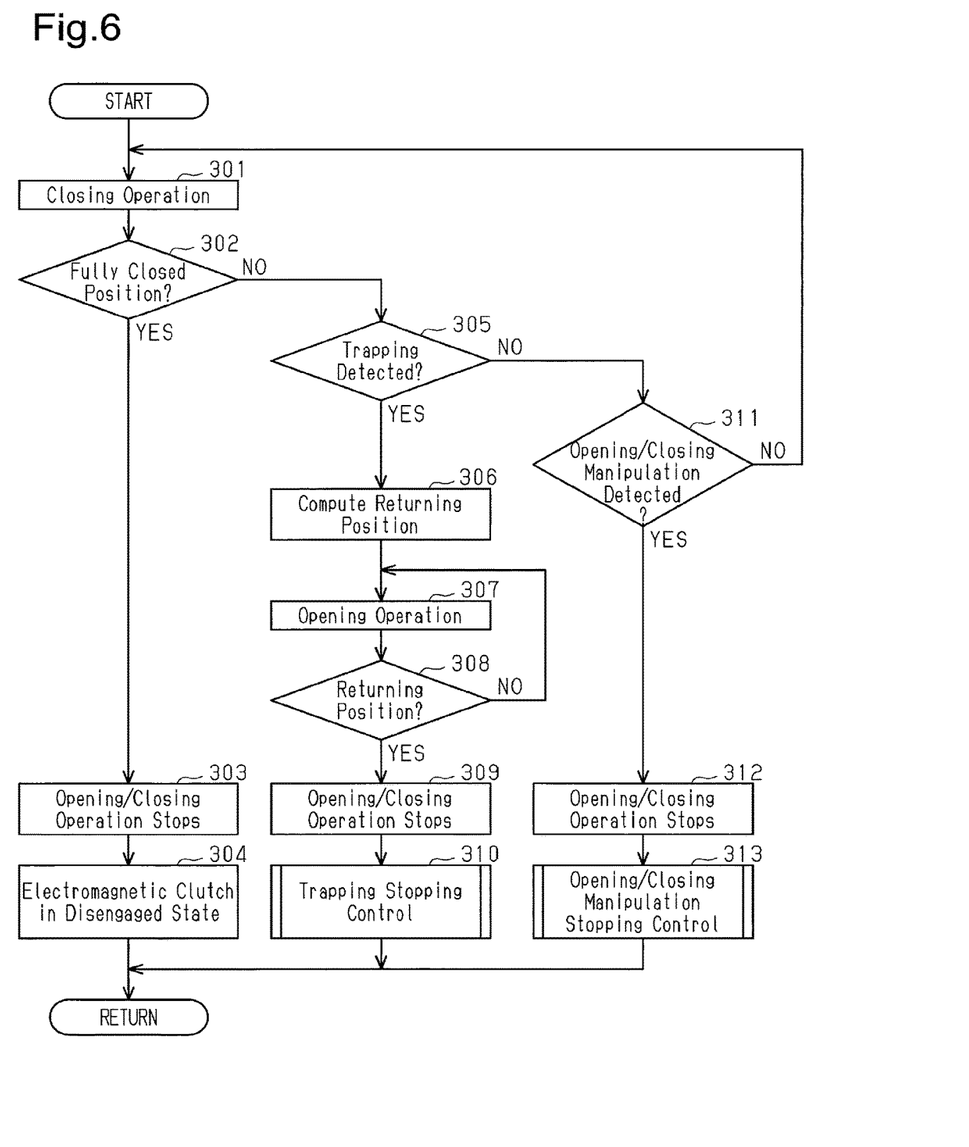
FIG. 6 is a flowchart illustrating a process of the closing operation control.

As shown in the flowchart of FIG. 6, the door ECU 23 drives the drive device 22 to close the slide door 7 (step 301) and determines whether the slide door 7 is at the fully closed position Pc (step 302). If the door ECU 23 determines that the slide door 7 is at the fully closed position Pc (step 302: YES), i.e., if the door ECU 23 does not detect trapping of a foreign object and the opening/closing manipulation of the user and the slide door 7 moves to the fully closed position Pc, the door ECU 23 stops the opening/closing operation of the slide door 7 by the drive device 22 (step 303) and disengages the electromagnetic clutch 32 (step 304).

If the door ECU 23 determines that the slide door 7 is not at the fully closed position Pc (step 302: NO), the door ECU 23 detects the presence/absence of trapping of a foreign object by the slide door 7 (step 305). If the door ECU 23 detects trapping of a foreign object (step 305: YES), the door ECU 23 computes a returning position at which the slide door 7 is stopped after being moved in the opposite direction, and then stopped, i.e., a position to which the slide door 7 is moved in the opening direction by a predetermined opening-and-returning distance from the door position at the time when the door ECU 23 detects the trapping (step 306). The door ECU 23 then inverts the moving direction of the slide door 7 and opens the slide door 7 (step 307) and determines whether the slide door 7 is at the returning position computed in step 306 (step 308). If the slide door 7 is at the returning position (step 308: YES), the door ECU 23 stops the opening/closing operation of the slide door 7 by the drive device 22 (step 309) and performs the trapping stopping control by which the electromagnetic clutch 32 is put in the engaged state to hold the slide door 7 (step 310). If the slide door 7 is not at the returning position (step 308: NO), the door ECU 23 moves to step 307, continues the opening operation, and repeats it until the slide door 7 moves to the returning position.

If the door ECU 23 does not detect the trapping of the foreign object by the slide door 7 (step 305: NO), the door ECU 23 detects the presence/absence of the opening/closing manipulation by the user (step 311). If the door ECU 23 detects the opening/closing manipulation (step 311: YES), the door ECU 23 stops the opening/closing operation of the slide door 7 by the drive device 22 (step 312). This engages the electromagnetic clutch 32 and the door ECU 23 performs the opening/closing manipulation stopping control to hold the slide door (step 313). If the door ECU 23 does not detect the opening/closing manipulation (step 311: NO), the door ECU 23 moves to step 301 and continues the closing operation.

Next, the trapping stopping control and the opening/closing manipulation stopping control, in which the slide door 7 is stopped at an intermediate position, will be described. The contents of the trapping stopping control and the contents of the opening/closing manipulation stopping control are the same with each other in both of the case in which the slide door 7 is stopped at an intermediate position during the opening operation and the case in which the slide door 7 is stopped at an intermediate position during the closing operation.

When performing the trapping stopping control and the opening/closing manipulation stopping control, the door ECU 23 maintains the electromagnetic clutch 32 in the engaged state. If the door ECU 23 detects the opening/closing manipulation by the user, the door ECU 23 stops the controls and opens/closes the slide door 7. The drive power should be continued to be supplied from the in-vehicle power supply 24 to the electromagnetic clutch 32 during the period in which the electromagnetic clutch 32 is in the engaged state as described above. Accordingly, as the time in which the slide door 7 is held at an intermediate position becomes longer, the voltage of the in-vehicle power supply 24 is reduced. In this regard, if a predetermined holding time has elapsed without detecting the opening/closing manipulation when performing the trapping stopping control and the opening/closing manipulation stopping control, the door ECU 23 of the present embodiment stops the supply of the drive power to the electromagnetic clutch 32 to disengage the electromagnetic clutch 32. In the present embodiment, the predetermined holding time in which the electromagnetic clutch 32 is in the engaged state is set longer in the case of the trapping stopping control (in which the trapping of the foreign object is detected and the slide door 7 is stopped) than in the case of the opening/closing manipulation stopping control (in which the opening/closing operation is detected and the slide door 7 is stopped).

Specifically, in the trapping stopping control, the door ECU 23 stops the trapping stopping control and opens/closes the slide door 7 only when the door ECU 23 detects the opening/closing manipulation of the user by the driver's seat switch 41 or the handle switch 42. Specifically, if the opening manipulation signal is supplied from each of the switches 41 and 42, the door ECU 23 opens the slide door 7. If the closing manipulation signal is supplied from the switch 41 or 42, the door ECU 23 closes the slide door 7. In the trapping stopping control, when the door ECU 23 detects the opening/closing manipulation of the user by the pillar switch 43 or the portable device switch 44a of the portable device 44, the door ECU 23 does not open/close the slide door 7 and maintains the state in which the slide door 7 is stopped at an intermediate position. That is, in the present embodiment, the driver's seat switch 41 and the handle switch 42 correspond to an opening/closing manipulation detector, and the pillar switch 43 and the portable device switch 44a of the portable device 44 correspond to an invalid opening/closing manipulation detector. When the first holding time has elapsed without detecting the opening/closing manipulation by the driver's seat switch 41 or the handle switch 42, the door ECU 23 stops the supply of the drive power to the electromagnetic clutch 32 to disengage the electromagnetic clutch 32.

In the opening/closing manipulation stopping control, if the door ECU 23 detects the opening/closing manipulation of the user, the door ECU 23 stops the opening/closing stopping control and opens/closes the slide door 7 regardless of which switch has detected the manipulation. When the second holding time has elapsed without detecting the opening/closing manipulation by the user, the door ECU 23 stops the supply of the drive power to the electromagnetic clutch 32 to disengage the electromagnetic clutch 32. The second holding time is set shorter than the first holding time.

Next, a process of the trapping stopping control will be described.

Figure 7:
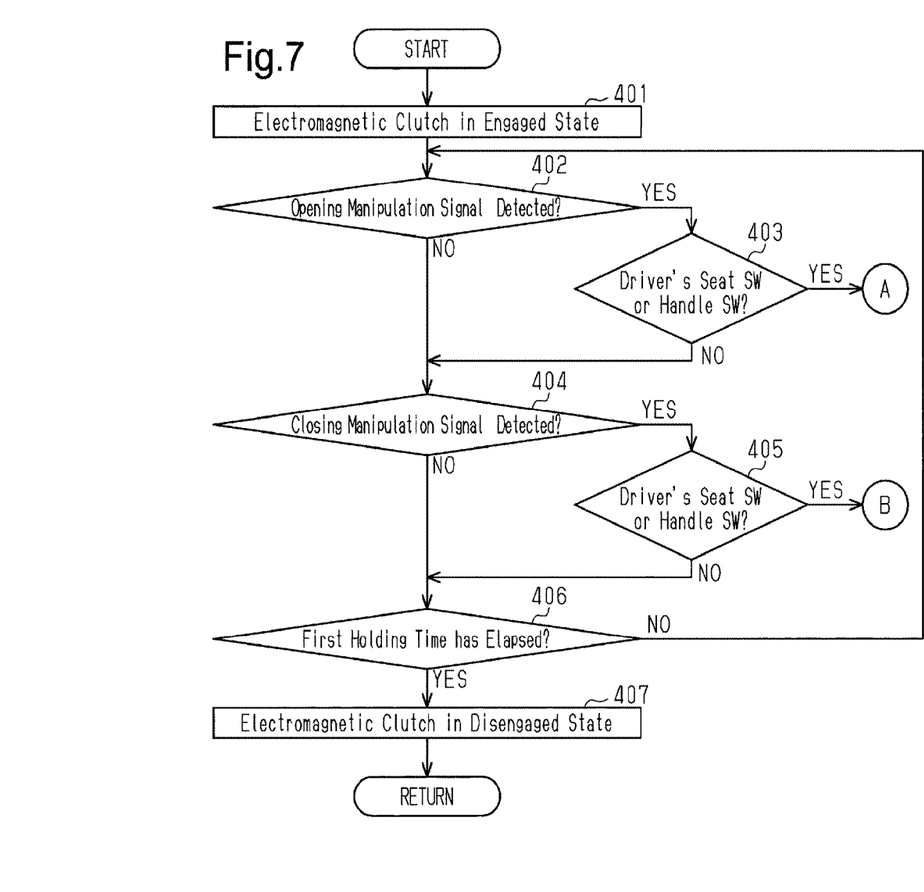
FIG. 7 is a flowchart illustrating a process of performing a trapping stopping control according to a first embodiment.

As shown in FIG. 7, the door ECU 23 put the electromagnetic clutch 32 in the engaged state first (step 401). The door ECU 23 then determines whether the opening manipulation signal has been input (step 402). If the opening manipulation signal has been input (step 402: YES), the door ECU 23 determines whether the opening manipulation signal was input from the driver's seat switch 41 or the handle switch 42, i.e., whether the opening/closing manipulation has been detected by the switch 41 or 42 (step 403). If the opening/closing manipulation has been detected by the switch 41 or 42 (step 403: YES), the door ECU 23 moves to step 102 of the flowchart shown in FIG. 4 and performs the opening operation control. In contrast, if the opening manipulation signal has not been input (step 402: NO), and if the opening/closing manipulation has not been detected by the driver's seat switch 41 or the handle switch 42 (step 403: NO), the door ECU 23 determines whether the closing manipulation signal has been input (step 404).

If the closing manipulation signal is input (step 404: YES), the door ECU 23 determines whether the opening/closing manipulation was detected by the driver's seat switch 41 or the handle switch 42 (step 405). If the opening/closing manipulation is detected by the switch 41 or 42 (step 405: YES), the door ECU 23 moves to step 104 of the flowchart shown in FIG. 4, and performs the closing operation control. In contrast, if the closing manipulation signal has not been input (step 404: NO) and if the opening/closing manipulation has not been detected by the driver's seat switch 41 or the handle switch 42 (step 405: NO), the door ECU 23 determines whether the first holding time has elapsed since the electromagnetic clutch 32 was put in the engaged state (step 406).

If the first holding time has not elapsed since the electromagnetic clutch 32 was put in the engaged state (step 406: NO), the door ECU 23 moves to step 402 and determines whether the opening manipulation signal has been input. If the first holding time has elapsed since the electromagnetic clutch 32 was put in the engaged state without performing the opening/closing manipulation (step 406: YES), the door ECU 23 stops the supply of the drive power to the electromagnetic clutch 32 to disengage the electromagnetic clutch 32 (step 407).

Next, a process of the opening/closing manipulation stopping control will be described.

Figure 8:
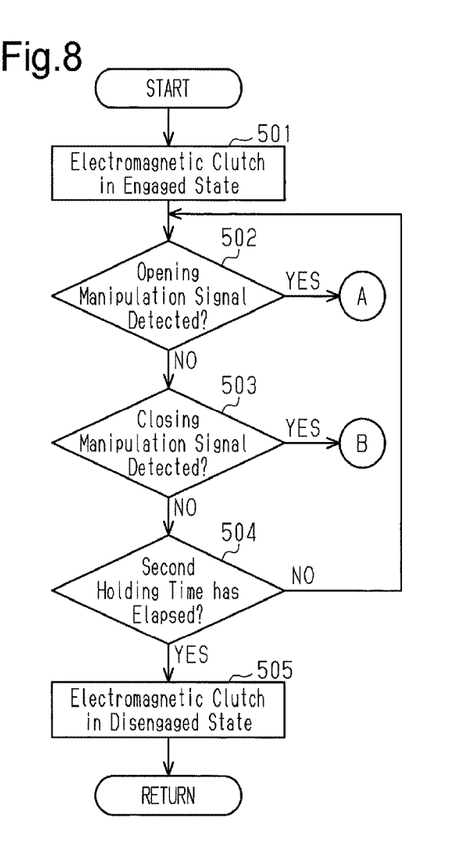
FIG. 8 is a flowchart illustrating a process of performing an opening/closing manipulation stopping control according to the first embodiment.

As shown in FIG. 8, the door ECU 23 put the electromagnetic clutch 32 in the engaged state first (step 501). The door ECU 23 then determines whether the opening manipulation signal has been input (step 502). If the opening manipulation signal has been input (step 502: YES), the door ECU 23 moves to step 102 of the flowchart shown in FIG. 4 and opens the slide door 7. In contrast, if the opening manipulation signal has not been input (step 502: NO), the door ECU 23 determines whether the closing manipulation signal has been input (step 503).

If the closing manipulation signal has been input (step 503: YES), the door ECU 23 moves to step 104 of the flowchart shown in FIG. 4 and closes the slide door 7. In contrast, if the closing manipulation signal has not been input (step 503: NO), the door ECU 23 determines whether the second holding time has elapsed since the electromagnetic clutch 32 was put in the engaged state (step 504).

If the second holding time has not elapsed since the electromagnetic clutch 32 was put in the engaged state (step 504: NO), the door ECU 23 moves to step 502 and determines whether the opening manipulation signals are input. If the second holding time has elapsed since the electromagnetic clutch 32 was put in the engaged state without performing the opening/closing manipulation (step 504: YES), the door ECU 23 stops the supply of the drive power to the electromagnetic clutch 32 so that the electromagnetic clutch 32 is put in the disengaged state (step 505).

Next, an operation of the present embodiment will be described.

When a user performs the opening/closing manipulation during the opening/closing operation of the slide door 7, the slide door 7 stops at an intermediate position at which the opening/closing manipulation is detected. At this time, the electromagnetic clutch 32 is put in the engaged state. This holds the door position of the slide door 7 by the holding force in accordance with the holding torque of the slide motor 31. When the user performs the opening/closing manipulation on the portable device switch 44a of the portable device 44, the slide door 7 opens/closes again. In contrast, if the second holding time has elapsed since the slide door 7 was stopped at an intermediate position without performing the opening/closing manipulation, the supply of the drive power to the electromagnetic clutch 32 is stopped to disengage the electromagnetic clutch 32.

If a foreign object is trapped during the opening/closing operation of the slide door 7, the slide door 7 moves in the opposite direction from the door position at which the trapping is detected by a predetermined distance, and then stops. At this time, the electromagnetic clutch 32 is put in the engaged state so that the door position of the slide door 7 is held by the holding force in accordance with the holding torque of the slide motor 31. When the user removes the foreign object and then performs the opening/closing manipulation on the driver's seat switch 41 or the door handle 14, the slide door 7 opens/closes again. At this time, even if another user performs the opening/closing manipulation on the portable device switch 44a of the portable device 44 or the pillar switch 43, the slide door 7 does not open/close. In contrast, if the first holding time has elapsed without performing the opening/closing manipulation, the supply of the drive power to the electromagnetic clutch 32 is stopped to disengage the electromagnetic clutch 32.

The present embodiment has the following advantages.

(1) To stop the slide door 7 at an intermediate position, the door ECU 23 put the electromagnetic clutch 32 in the engaged state and, then puts the electromagnetic clutch 32 in the disengaged state after a predetermined time has elapsed since the door ECU 23 stopped the slide door 7 at an intermediate position. This limits the reduction of the voltage of the in-vehicle power supply 24. The first holding time, in which the electromagnetic clutch 32 is maintained in the engaged state when the trapping of the foreign object is detected, is set longer than the second holding time, in which the electromagnetic clutch 32 is maintained in the engaged state when the opening/closing manipulation is detected.

When trapping of a foreign object is detected during the opening/closing operation, the slide door 7 is stopped due to the fact that the foreign object limits the movement of the slide door 7 regardless of the intention of the user. This requires a time for a user to check the situation and remove the foreign object. Accordingly, if the time in which the slide door 7 is held by the electromagnetic clutch 32 is short, the slide door 7 may unintentionally move due to factors such as its own weight during the period in which the user removes the foreign object, for example. This may significantly reduce the convenience.

If the opening/closing manipulation is detected during the opening/closing operation, the slide door 7 is stopped according the user's intention. The user hence substantially grasps the situation. Accordingly, even if the time in which the slide door 7 is held by the electromagnetic clutch 32 is short, the convenience is not easily reduced. Therefore, the first holding time is set longer than the second holding time as in the present embodiment. This maintains the convenience and limits the reduction of the voltage of the in-vehicle power supply.

(2) When detecting trapping of a foreign object and stopping the slide door 7, the door ECU 23 opens/closes the slide door 7 if the door ECU 23 detects the opening/closing manipulation by the handle switch 42. This allows the user who has come near the slide door 7 and removed the foreign object to open/close the slide door 7 again on the spot, for example, and improves the convenience.

(3) When detecting the trapping of a foreign object and stopping the slide door 7, the door ECU 23 opens/closes the slide door 7 if the door ECU 23 detects the opening/closing manipulation by the driver's seat switch 41. This allows the user as a driver to open/close the slide door 7 again without leaving the driver's seat, for example, and improves the convenience.

(4) When detecting the trapping of a foreign object and stopping the slide door 7, the door ECU 23 disables the opening/closing manipulation by the portable device switch 44a of the portable device 44 or the pillar switch 43 and does not open/close the slide door 7 even if the door ECU 23 detects the manipulation. Accordingly, the user who is away from the slide door 7 and cannot easily recognize whether the foreign object has been removed performs the opening/closing manipulation. This limits the opening/closing operation of the slide door 7 in the situation in which the foreign object has not yet been removed.

(5) When detecting the trapping of a foreign object and stopping the slide door 7, the door ECU 23 opens/closes the slide door 7 only when the door ECU 23 detects the opening/closing manipulation by the driver's seat switch 41 or the handle switch 42. Accordingly, even if the door ECU 23 detects the opening/closing operation by a switch other than the switches 41 and 42, the door ECU 23 disables the operation and does not open/close the slide door 7. This advantageously limits the opening/closing of the slide door 7 in the situation in which the user has been away from the slide door 7 and the foreign object has not yet been removed, for example.

Second Embodiment

Next, a vehicle opening/closing body control device according to a second embodiment will be described with reference to the drawings. The main difference between the present embodiment and the above first embodiment is only the trapping stopping control and the opening/closing manipulation stopping control. For purposes of illustration, same reference numerals are given to those components that are the same as the corresponding components of the first embodiment and detailed descriptions are omitted.

The door ECU 23 of the present embodiment detects the voltage of the in-vehicle power supply 24 and performs the trapping stopping control and the opening/closing manipulation stopping control. In this case, if the voltage is less than or equal to a voltage determination threshold value, the drive power to be supplied to engage the electromagnetic clutch 32 is reduced to be less than the usual power. In the present embodiment, the voltage determination threshold value in the case of the trapping stopping control is set less than that in the case of the opening/closing manipulation stopping control. That is, when the voltage of the in-vehicle power supply 24 is reduced, the drive power is not more easily reduced in the case of the trapping stopping control than in the case of the opening/closing manipulation stopping control.

In details, when performing the trapping stopping control, if the absolute value of the detected voltage E from the in-vehicle power supply 24 is less than or equal to the first voltage determination threshold value Eth1, the door ECU 23 reduces the amount of the drive power supplied to the electromagnetic clutch 32 to a value less than the usual amount of the power to be supplied. The usual amount of the power to be supplied refers to an amount of the power to be supplied if the detected voltage E is greater than the first voltage determination threshold value Eth1. When performing the opening/closing manipulation stopping control, if the detected voltage E is less than or equal to the second voltage determination threshold value Eth2, the door ECU 23 reduces the amount of the drive power to be supplied to the electromagnetic clutch 32 to a value less than the usual amount of the power to be supplied. The second voltage determination threshold value Eth2 is set as a value less than the first voltage determination threshold value Eth1. In the same manner as in the above first embodiment, the door ECU 23 detects the opening/closing manipulation to open/close the slide door 7. As the predetermined holding time has elapsed, the door ECU 23 also stops the supply of the drive power to the electromagnetic clutch 32 to disengage the electromagnetic clutch 32.

Next, a process of the trapping stopping control will be described.

Figure 9:
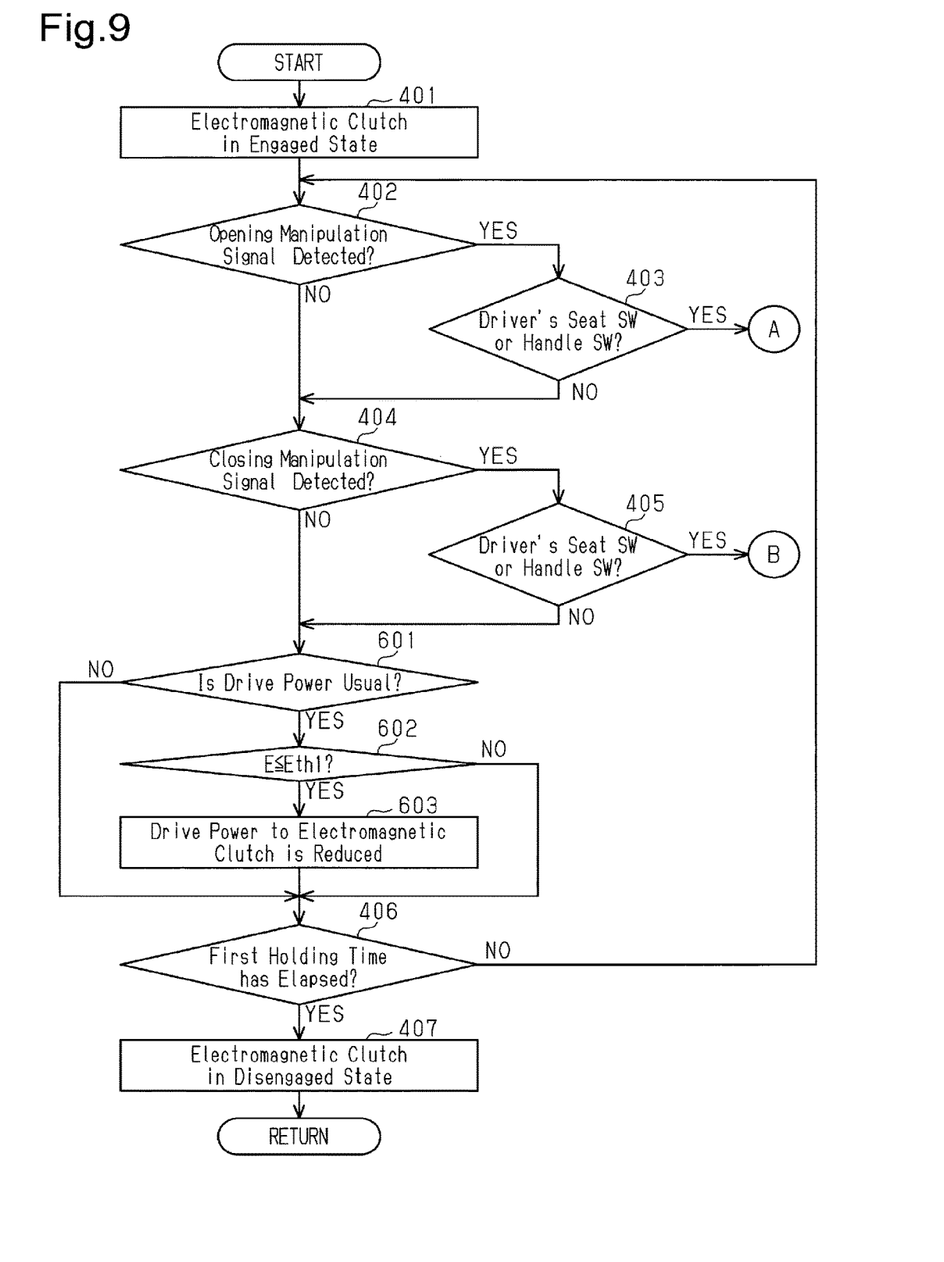
FIG. 9 is a flowchart illustrating a process of performing a trapping stopping control according to a second embodiment.

As shown in FIG. 9, in the same manner as in the above first embodiment, the door ECU 23 puts the electromagnetic clutch 32 in the engaged state (step 401). After the door ECU 23 detects the opening/closing manipulation by the user (steps 402 to 405), the door ECU 23 determines whether the amount of the drive power to be supplied to the electromagnetic clutch 32 is the usual amount of the power to be supplied (step 601). If the amount of the drive power to be supplied is the usual amount of the power to be supplied (step 601: YES), the door ECU 23 determines whether the detected voltage E is less than or equal to the first voltage determination threshold value Eth1 (step 602). If the detected voltage E is less than or equal to the first voltage determination threshold value Eth1 (step 602: YES), the door ECU 23 reduces the amount of the drive power to be supplied to the electromagnetic clutch 32 (step 603) and moves to step 406. In the same manner as in the above first embodiment, the door ECU 23 determines whether the first holding time has elapsed since the electromagnetic clutch 32 has been in the engaged state.

If the amount of the drive power to be supplied is reduced to be less than the usual amount of the power to be supplied (step 601: NO), and if the detected voltage E is greater than the first voltage determination threshold value Eth1 (step 602: NO), the door ECU 23 moves to step 406 in the same manner and determines whether the first holding time has elapsed since the electromagnetic clutch 32 was put in the engaged state.

Next, a process of the opening/closing manipulation stopping control will be described.

Figure 10:
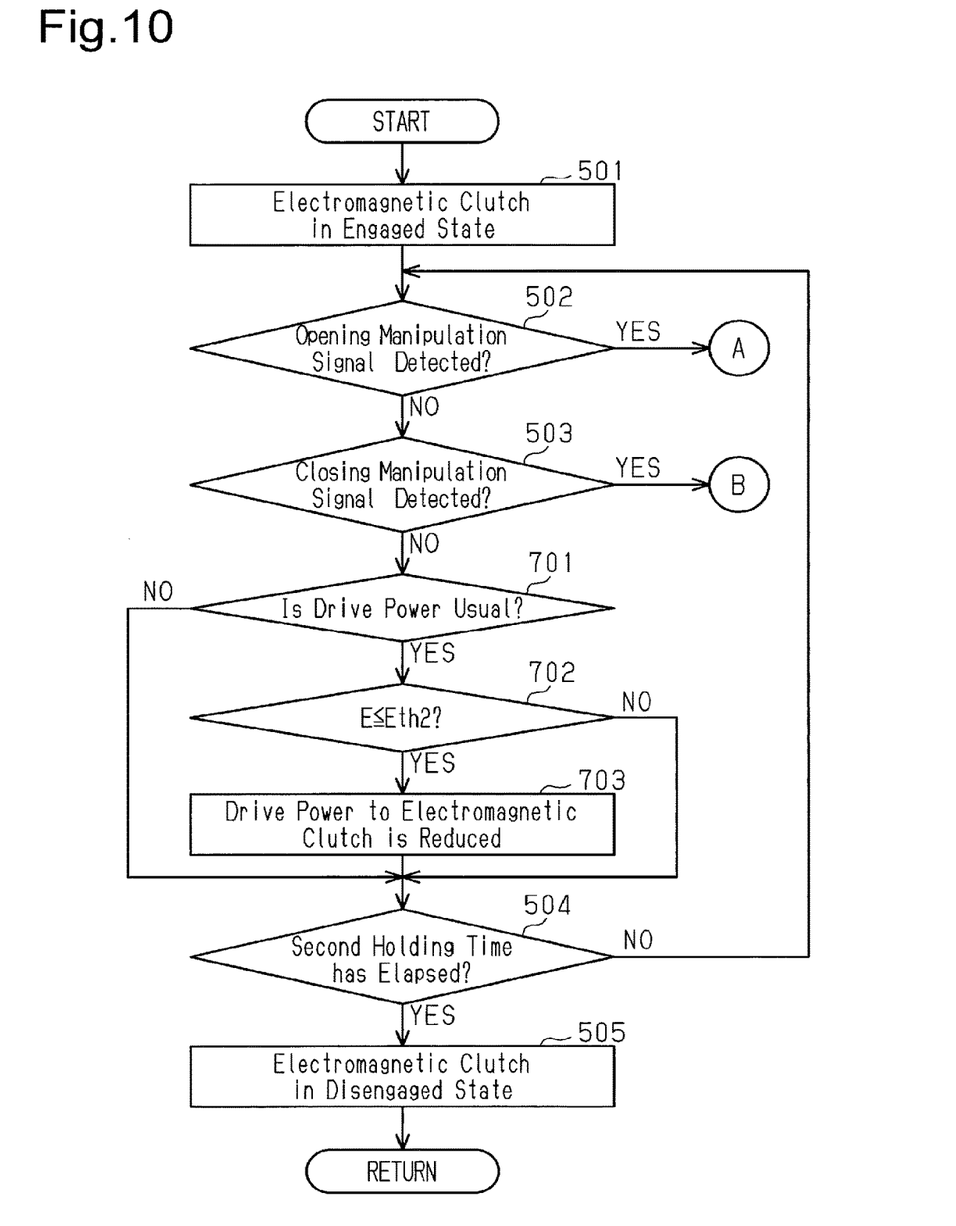
FIG. 10 is a flowchart illustrating a process of performing an opening/closing manipulation stopping control according to the second embodiment.

As shown in FIG. 10, in the same manner as in the above first embodiment, the electromagnetic clutch 32 is put in the engaged state by the door ECU 23 (step 501). After detecting the opening/closing manipulation by the user (steps 502 and 503), the door ECU 23 determines whether the amount of the drive power to be supplied to the electromagnetic clutch 32 is the usual amount of the power to be supplied (step 701). If the amount of the drive power to be supplied is the usual amount of the power to be supplied (step 701: YES), the door ECU 23 determines whether the detected voltage E is less than or equal to the second voltage determination threshold value Eth2 (step 702). If the detected voltage E is less than or equal to the second voltage determination threshold value Eth2 (step 702: YES), the door ECU 23 reduces the amount of the drive power to be supplied to the electromagnetic clutch 32 (step 703) and moves to step 504. In the same manner as in the above first embodiment, the door ECU 23 determines whether the second holding time has elapsed since the electromagnetic clutch 32 was put in the engaged state.

If the amount of the drive power to be supplied is reduced to be less than the usual amount of the power to be supplied (step 701: NO), and if the detected voltage E is greater than the second voltage determination threshold value Eth2 (step 702: NO), the door ECU 23 moves to step 504 in the same manner and determines whether the second holding time has elapsed since the electromagnetic clutch 32 was put in the engaged state.

The present embodiment has the following advantages. The present embodiment has the following advantages in addition to the advantages (1) to (5) of the first embodiment.

(6) The door ECU 23 reduces the amount of the drive power supplied to the electromagnetic clutch 32 if the voltage of the in-vehicle power supply 24 is less than or equal to the voltage determination threshold value. This delays the reduction of the voltage of the in-vehicle power supply 24.

(7) The first voltage determination threshold value Eth1 as a voltage determination threshold value when performing the trapping stopping control is set less than the second voltage determination threshold value Eth2 as a voltage determination threshold value when performing the opening/closing manipulation stopping control. If the amount of the drive power to be supplied to the electromagnetic clutch 32 is reduced, the slide door 7 easily moves due to factors such as its own weight. Trapping of a foreign object is detected and the slide door 7 is stopped as described above. In this case, if the slide door 7 unintentionally moves, the convenience may be significantly reduced. In this regard, in the above described configuration, the first voltage determination threshold value Eth1 is set less than the second voltage determination threshold value Eth2. This maintains the convenience and delays the reduction of the voltage of the in-vehicle power supply 24.

The above embodiments may be modified as follows.

In the above embodiments, when the opening/closing manipulation by the user is detected during the opening operation and the closing operation of the slide door 7, the slide door 7 is stopped at a door position at which the manipulation is detected. However, the embodiment is not limited to this. For example, the slide door 7 may be moved in the opposite direction by a predetermined distance from the door position at which the manipulation is detected, and then stopped.

In the above embodiments, when trapping of a foreign object is detected during the opening operation and the closing operation of the slide door 7, the slide door 7 is moved in the opposite direction by a predetermined distance, and then stopped. However, the present invention is not limited to this. The slide door 7 may be moved to the fully open position Po or the fully closed position Pc. Alternatively, the slide door 7 may be stopped at a door position at which trapping of a foreign object is detected.

In the above embodiments, the door ECU 23 recognizes a trigger signal supplied from a switch such as the handle switch 42 as a manipulation signal indicating the direction that is opposite to the operation direction of the slide door 7 immediately before regardless of the stopped position of the slide door 7. However, the present invention is not limited to this. The trigger signal may be recognized as a manipulation signal indicating the direction that is opposite to the operation direction of the slide door 7 immediately before only when the slide door 7 is at the fully open position Po or the fully closed position Pc. The trigger signal may be recognized as a manipulation signal indicating the direction that is the same as the operation direction of the slide door 7 immediately before when the slide door 7 is at an intermediate position. Accordingly, if the slide door 7 is stopped at an intermediate position during the closing operation of the slide door 7, for example, the user may manipulation the door handle 14 again to continue the closing operation of the slide door 7.

In the above embodiments, trapping of a foreign object is detected and the slide door 7 is stopped. In this case, the slide door 7 opens/closes only when the opening/closing manipulation is detected by the driver's seat switch 41 or the handle switch 42. However, the present invention is not limited to this. The slide door 7 may open/close only when the opening/closing manipulation is detected by the driver's seat switch 41. Alternatively, the slide door 7 may open/close only when the opening/closing manipulation is detected by the handle switch 42.

In the above embodiments, the trapping of the foreign object is detected and the slide door 7 is stopped. In this case, even if the opening/closing manipulation is detected by the pillar switch 43 or the portable device switch 44a of the portable device 44, the slide door 7 does not open/close. However, the present invention is not limited to this. The slide door 7 may open/close even when the opening/closing manipulation is detected by the pillar switch 43 or the portable device switch 44a. That is, all the opening/closing manipulation detectors may be configured as valid opening/closing manipulation detectors.

In the above embodiments, a predetermined holding time in which the engaged state of the electromagnetic clutch 32 is continued is set longer in the case of performing the trapping stopping control than in the case of performing the opening/closing manipulation stopping control. That is, the first holding time is set longer than the second holding time. The present invention is not limited to this. The second holding time may be set longer than the first holding time. According to the above configuration, when trapping of a foreign object is detected and the slide door 7 is stopped, the slide door 7 is allowed to be easily opened/closed manually immediately. Also, the intention of the user to stop the slide door 7 is reflected as long as possible, and the reduction of the voltage of the in-vehicle power supply 24 is limited.

In the same manner, in the above second embodiment, the first voltage determination threshold value Eth1 may be greater than the second voltage determination threshold value Eth2. That is, when the detected voltage E from the in-vehicle power supply 24 is reduced, the drive power may be more easily reduced in the case of the trapping stopping control than in the case of the opening/closing manipulation stopping control.

In the above embodiments, even if the slide door 7 moves in the closing direction from the state in which the slide door 7 is located in the fully open range to a position beyond the assumed fully open position Po', the closing operation control need not be performed unless the opening/closing manipulation by the user is detected.

In the above embodiments, the power slide door device 21 includes the driver's seat switch 41, the handle switch 42, the pillar switch 43, and the portable device switch 44a as opening/closing manipulation detectors, which detect the opening/closing manipulation of the user. The present invention is not limited to this. For example, the pillar switch 43 may be omitted. Alternatively, other switches may be employed.

In the above embodiments, the predetermined closing-and-returning distance and the predetermined opening-and-returning distance are set as the same distance. The predetermined closing-and-returning distance and the predetermined opening-and-returning distance may be set different from each other.

In the above embodiments, as the fully opening lock 12, a configuration may be employed in which each roller 6 rides over a protrusion (not shown) provided on the corresponding one of the rails 3 to 5 to hold the slide door 7 at the fully open position Po, for example. In this case, the movement of the slide door 7 at the fully open position Po in the closing direction is allowed by applying a force to the slide door 7 required for each roller 6 to ride over the protrusion.

In the above embodiments, trapping of a foreign object is detected based on the detection current I supplied from the touch sensor 46. However, the present invention is not limited to this. For example, the touch sensor 46 may be configured to supply a detection voltage in accordance with the contact pressure to detect the trapping of the foreign object based on the detection voltage. As the touch sensor 46, other configurations such as a configuration in which two electrodes sandwich piezoelectric material, for example, may be employed.

In the above embodiments, it is detected whether the slide door 7 is in the stopped state (whether trapping has occurred) based on the operation velocity V of the slide door 7. However, the present invention is not limited to this. It may be determined whether the slide door 7 is in the stopped state based on the motor current supplied to the slide motor 31, for example.

In the above embodiments, the number of pulses of the pulse signals supplied from the pulse sensor 33 is counted to detect the door position (operation velocity V) of the slide door 7. However, the present invention is not limited to this. The door position (operation velocity V) of the slide door 7 may be detected by detecting the absolute angle of the slide motor 31, for example. For example, the door position may be directly detected using a displacement sensor, for example.

In the above embodiments, a configuration is employed in which the drive device 22 includes the slide actuator 25, the closer actuator 26, and the release actuator 27. However, the present invention is not limited to this. For example, the closer actuator 26 may be omitted and the slide actuator 25 may move the slide door 7 that is ajar to the fully closed position Pc.

In the above embodiments, the control for limiting the reduction of the voltage of the in-vehicle power supply 24 is performed on the power slide door device 21, which opens/closes the slide door 7. However, the control for limiting the reduction of the voltage of the in-vehicle power supply may be applied to other vehicle opening/closing body control devices that open/close opening/closing bodies other than the slide door 7, such as a rear door, a luggage door, and a trunk lid provided on the rear side of the vehicle.

The invention claimed is:

1. A vehicle-door opening and closing body control device, comprising:
 a drive device, which opens and closes an opening and closing body of a vehicle;
 a trapping detector, which detects a trapping of a foreign object by the opening and closing body;
 an opening and closing manipulation detector, which detects an opening and closing manipulation of the opening and closing body by the drive device; and
 a controller, which controls an operation of the drive device such that the opening and closing body is stopped at an intermediate position in an operation range of the opening and closing body when the trapping of the foreign object is detected or when the opening and closing manipulation is detected during an opening operation or closing operation of the opening and closing body, wherein
 the drive device includes an electromagnetic clutch, which is configured to transmit a driving force to the opening and closing body and engages or disengages transmission of the driving force between the opening and closing body and a motor as a driving source of the drive device,
 the controller is configured to supply a drive power from an in-vehicle power supply to the electromagnetic clutch, based on a voltage of the in-vehicle power supply,
 to stop the opening and closing body at an intermediate position, the controller supplies the drive power based on the voltage of the in-vehicle power supply to the electromagnetic clutch to put the electromagnetic clutch in an engaged state and then stops the supply of the drive power to the electromagnetic clutch to put the electromagnetic clutch in a disengaged state after a predetermined holding time has elapsed since the controller has stopped the opening and closing body at the intermediate position, and the predetermined holding time differs between a case where the trapping of the foreign object is detected and a case where the opening and closing manipulation is detected.

2. The vehicle-door opening and closing body control device according to claim 1, wherein the predetermined holding time is longer in the case where the trapping of the foreign object is detected than in the case where the opening and closing manipulation is detected.

3. The vehicle-door opening and closing body control device according to claim 1,
   wherein the opening and closing manipulation detector includes a valid opening and closing manipulation detector and an invalid opening and closing manipulation detector,
   wherein when the opening and closing body is in a stopped state at the intermediate position due to the trapping of the foreign object, the valid opening and closing manipulation detector validates a detected opening and closing manipulation, and the invalid opening and closing manipulation detector invalidates the detected opening and closing manipulation.

4. The vehicle-door opening and closing body control device according to claim 3, wherein the valid opening and closing manipulation detector includes an integrated opening and closing manipulation detector that is movable integrally with the opening and closing body.

5. The vehicle-door opening and closing body control device according to claim 3, wherein the valid opening and closing manipulation detector includes a driver's seat opening and closing manipulation detector provided in a driver's seat region.

6. The vehicle-door opening and closing body control device according to claim 3, wherein the invalid opening and closing manipulation detector includes a portable device opening and closing manipulation detector provided in a portable device.

7. The vehicle-door opening and closing body control device according to claim 3, wherein the valid opening and closing manipulation detector consists of an integrated opening and closing manipulation detector provided integrally with the opening and closing body and a driver's seat opening and closing manipulation detector provided in a driver's seat region.

8. The vehicle-door opening and closing body control device according to claim 1, wherein the controller reduces the drive power to be supplied to the electromagnetic clutch when the voltage of the in-vehicle power supply is lower than or equal to a voltage determination threshold value.

9. The vehicle-door opening and closing body control device according to claim 8, wherein the voltage determination threshold value differs between the case where the trapping of the foreign object is detected and the case where the opening and closing manipulation is detected.

10. An opening and closing system for a vehicle, comprising a vehicle-door opening and closing body control device, the vehicle-door opening and closing body control device comprising:
    a drive device, which opens and closes an opening and closing body of a vehicle;
    a trapping detector, which detects a trapping of a foreign object by the opening and closing body;
    an opening and closing manipulation detector, which detects an opening and closing manipulation of the opening and closing body by the drive device; and
    a controller, which controls an operation of the drive device such that the opening and closing body is stopped at an intermediate position in an operation range of the opening and closing body when the trapping of the foreign object is detected or when the opening and closing manipulation is detected during an opening operation or closing operation of the opening and closing body, wherein
    the drive device includes an electromagnetic clutch, which is configured to transmit a driving force to the opening and closing body and engages or disengages transmission of the driving force between the opening and closing body and a motor as a driving source of the drive device,
    the controller is configured to supply a drive power from an in-vehicle power supply to the electromagnetic clutch, based on a voltage of the in-vehicle power supply,
    to stop the opening and closing body at an intermediate position, the controller supplies the drive power based on the voltage of the in-vehicle power supply to the electromagnetic clutch to put the electromagnetic clutch in an engaged state and then stops the supply of the drive power to the electromagnetic clutch to put the electromagnetic clutch in a disengaged state after a predetermined holding time has elapsed since the controller has stopped the opening and closing body at the intermediate position, and
    the predetermined holding time differs between a case where the trapping of the foreign object is detected and a case where the opening and closing manipulation is detected.

* * * * *